United States Patent
Severini

Patent Number: 6,155,640
Date of Patent: Dec. 5, 2000

[54] BENCH SEAT HAVING TRACK ASSEMBLY WITH BI-DIRECTIONAL RELEASE

[75] Inventor: Joseph Severini, Holland Landing, Canada

[73] Assignee: Magna Interior Systems Inc., Aurora, Canada

[21] Appl. No.: 09/209,617

[22] Filed: Dec. 11, 1998

Related U.S. Application Data

[60] Provisional application No. 60/069,565, Dec. 12, 1997.

[51] Int. Cl.[7] .................................................... A47C 1/02
[52] U.S. Cl. ...................................... 297/344.1; 297/429
[58] Field of Search ................................... 248/429, 430; 297/344.1

[56] References Cited

U.S. PATENT DOCUMENTS

| | | | |
|---|---|---|---|
| 2,336,433 | 12/1943 | Woina | 155/14 |
| 3,220,690 | 11/1965 | Caughey . | |
| 4,497,518 | 2/1985 | Nishimura et al. | 297/341 |
| 4,526,424 | 7/1985 | Korth | 297/473 |
| 4,569,557 | 2/1986 | Goforth . | |
| 4,588,226 | 5/1986 | Young et al. | 297/349 |
| 4,621,867 | 11/1986 | Perring et al. | 297/341 |
| 4,653,807 | 3/1987 | Hirose et al. . | |
| 5,082,228 | 1/1992 | Shimazaki . | |
| 5,425,522 | 6/1995 | Retzlaff . | |
| 5,498,052 | 3/1996 | Severini et al. | 296/65.1 |
| 5,520,362 | 5/1996 | Gerlach | 248/429 |
| 5,567,013 | 10/1996 | Chang | 297/341 |

*Primary Examiner*—Milton Nelson, Jr.
*Attorney, Agent, or Firm*—Howard & Howard

[57] ABSTRACT

A vehicle seat has a mounting structure comprising a pair of interengaged tracks slidably mounting the vehicle seat and a pair of locking assemblies operatively associated with the tracks to selectively engage and disengage each of said interengaged tracks and a bi-directional actuation assembly. The bi-directional actuation assembly has a rotatably mounted handle. A roller is mounted on a pivotally mounted lever. The lever operatively connects the handle to the roller. A spring biases the roller to a neutral position. A cable is tensionally associated with each of the locking assemblies and extends over the roller. Rotation of the handle in either direction responsively moves the roller against the bias thereby tensioning the cable and moving both of the locking assemblies to a disengage position.

20 Claims, 8 Drawing Sheets

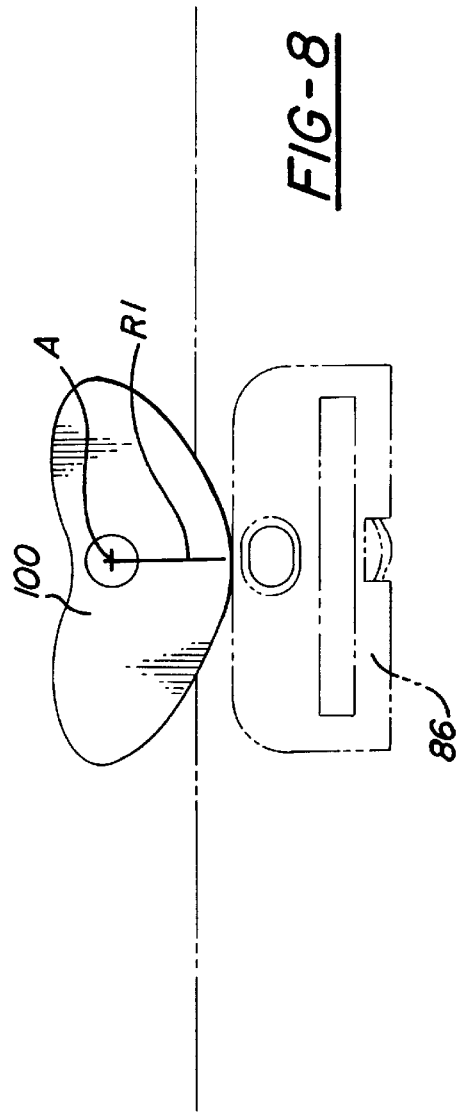
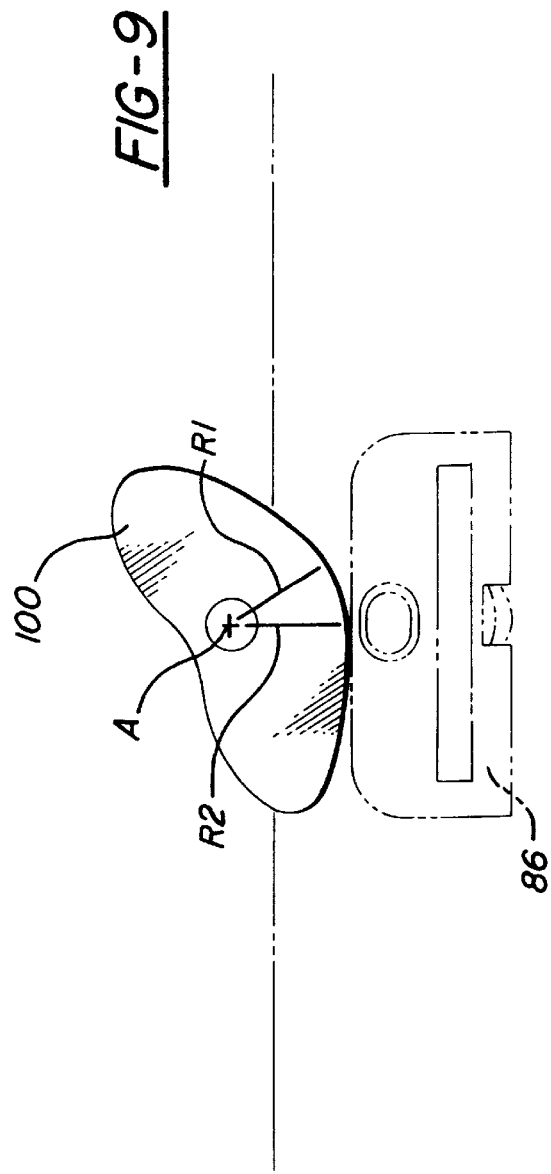

BENCH SEAT HAVING TRACK ASSEMBLY WITH BI-DIRECTIONAL RELEASE

This application claims the benefit of U.S. provisional Ser. No. 60/069,565 filed Dec. 12, 1997.

FIELD OF INVENTION

This invention relates to a track assembly for a bench seat. In particular, this invention relates to a track assembly with a bi-directional release.

BACKGROUND OF INVENTION

Conventional bench vehicle seats are mounted on a track assembly for forward and aft adjustment. The mechanism for releasing the seat track is normally located under the seat and is only accessible from the front of the seat. Thus operation of the seat can only be accomplished by a person either sitting on or positioned in front of the seat.

Other track assemblies such as the seat track described in U.S. Pat. No. 5,520,362 provide an ability to operate the seat from both the front and the rear of the seat. However, the operator is required to either pull or push a rod to effect a release of the seat track. The push or pull motion is inconvenient, particularly if the operator is sitting on the seat and has to reach under the seat.

Bi-directional releases for use with hinges and latch assemblies are known from U.S. Pat. No. 5,498,052.

SUMMARY OF INVENTION

The disadvantages of the prior art may be overcome by providing a bench type vehicle seat having a track assembly with a bidirectional actuation assembly enabling operation thereof in either rotational direction.

It is desirable to provide a pair of bi-directional actuation assemblies mounted for access from either in front of or behind the seat.

According to one aspect of the invention, there is provided a vehicle seat having mounting structure comprising a pair of interengaged tracks slidably mounting the vehicle seat and a pair of locking assemblies operatively associated with the tracks to selectively engage and disengage each of said interengaged tracks and a bi-directional actuation assembly. The bi-directional actuation assembly has a rotatably mounted handle. A roller is mounted on a pivotally mounted lever. The lever operatively connects the handle to the roller. A spring biases the roller to a neutral position. A cable is tensionally associated with each of the locking members and extends over the roller. Rotation of the handle in either sense responsively moves the roller against the bias thereby tensioning the cable and moving both of the locking members to a disengage position releasing the interengaged tracks enabling the sliding movement.

IN THE DRAWINGS

In drawings which illustrate an embodiment of the invention,

FIG. 8 is a side elevation of the release cam of the interengaged track members of FIG. 6;

FIG. 9 is a side elevation of the release cam of FIG. 8 illustrating the cam in the release position;

DETAILED DESCRIPTION

Figure 1:
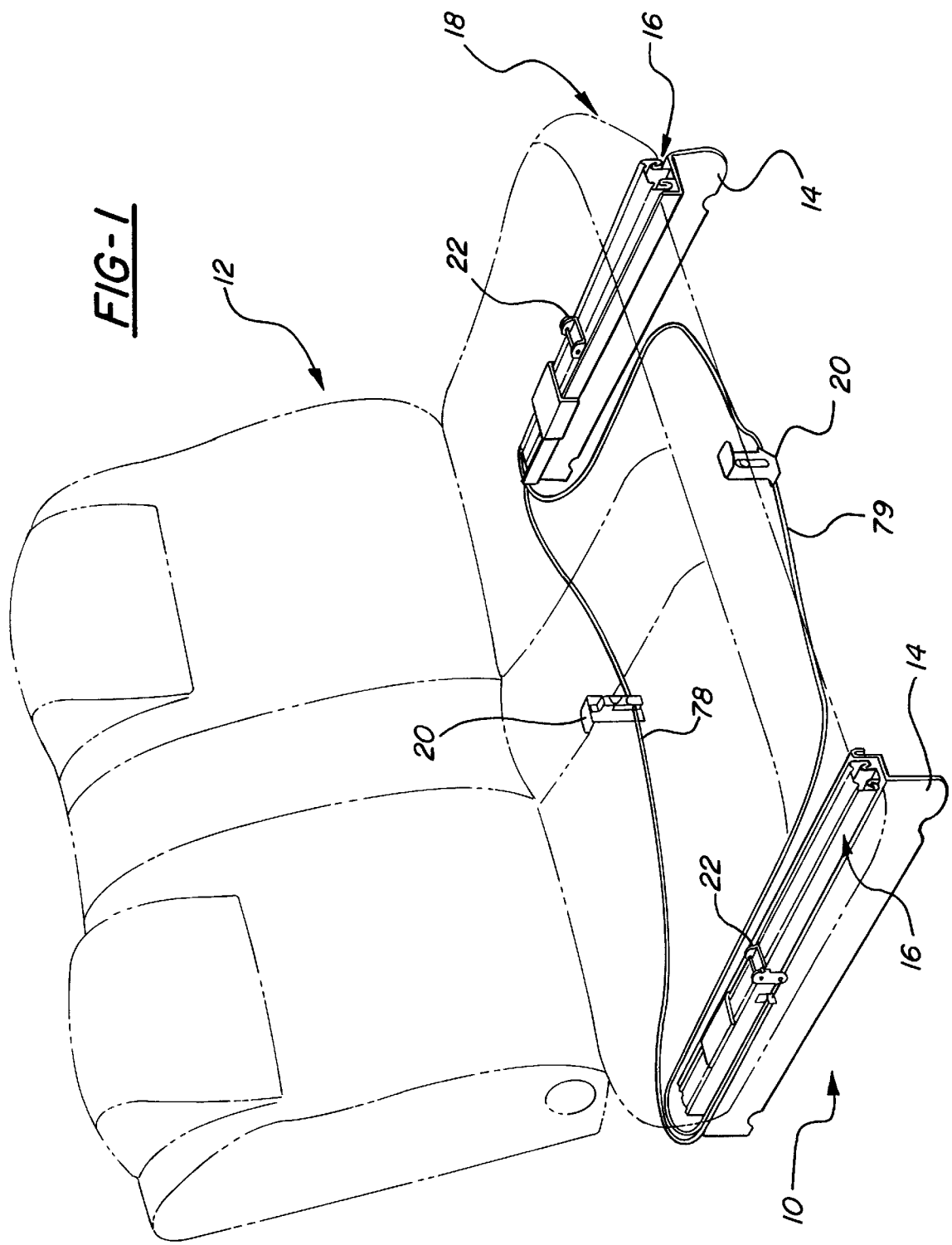
FIG. 1 is a perspective view showing a bench seat assembly in phantom and track assembly according to the present invention.

Referring to FIG. 1, a seat track assembly 10 of the present invention is illustrated. The seat track 10 is mounted under a bench seat assembly 12 which is illustrated in phantom lines. The seat track assembly 10 generally comprises a pair of risers 14 and a pair of interengaged tracks 16. The risers 14 and the tracks 16 are mounted under the ends of the bench seat assembly 12. Intermediate the ends of a seat cushion assembly 18 are a pair of bidirectional actuation assemblies 20 which are operatively coupled to a releasing assembly 22 mounted on each of the tracks 16.

Figure 2:
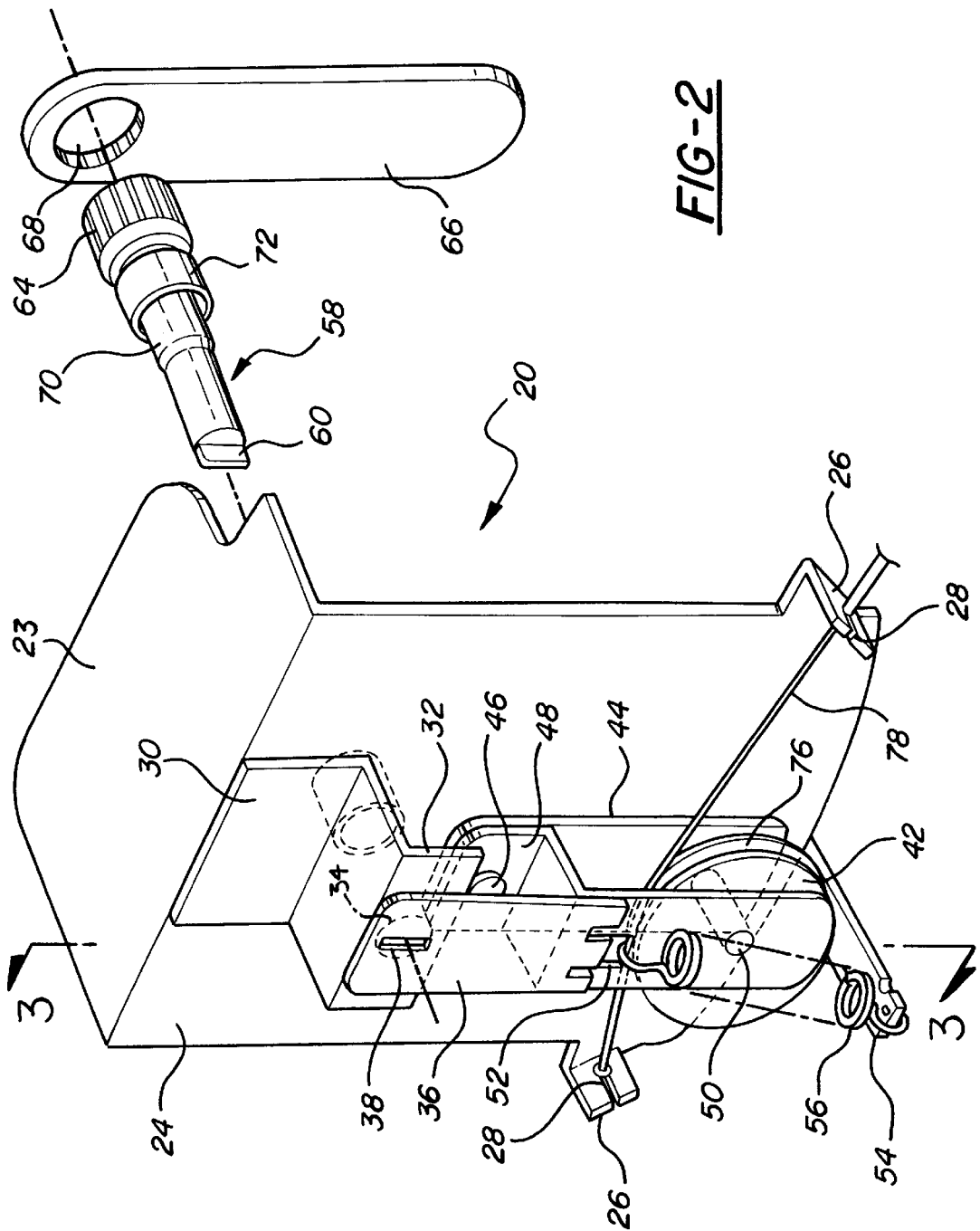
FIG. 2 is a partially exploded perspective view of a bi-directional actuation assembly of the track assembly of FIG. 1.

Referring to FIG. 2, one of the actuation assemblies 20 is illustrated. The actuation assembly 20 generally comprises an L-shaped mounting bracket 23 having a face plate 24. A pair of bowden wire support tabs 26 are integrally formed on opposite lower corners of the face plate 24. Tabs 26 extend perpendicularly outwardly. Each tab 26 has a keyhole shaped slot 28 for receiving a respective cable or bowden wire 78, 79, as will be discussed hereinbelow.

The face plate 24 has a spindle support bracket 30 which has an "S" shape configuration. A lower panel 32 has a centrally positioned aperture 34.

An actuation link 36 has a slot 38 at one end thereof. Slot 38 aligns with the aperture 34. The lower end of actuation link 36 has an inturned tab 40 (FIG. 3).

A roller 42 is mounted at the end of a roller lever 44 which is pivotally mounted to the face plate 24 by rivet 46. An "S" shaped support plate 48 overlies the roller lever 44 in the region of rivet 46. Pin 50 extends between apertures on each of the roller lever 44 and the support plate 48 to support the roller 42. Roller 42 can either be rotatably or fixedly mounted on pin 50. The face of the support plate 48 has a slot 52. Tab 40 extends into slot 52.

Extending from the base of the face plate 24 is an "L" shaped spring support arm 54. Spring 56 extends between arm 54 and slot 52. Spring 56 has conventional hooks at each end thereof for attaching to the arm 54 and slot 52. Spring 56 biases the roller lever 44 and roller 42 to a neutral position.

Figure 3:
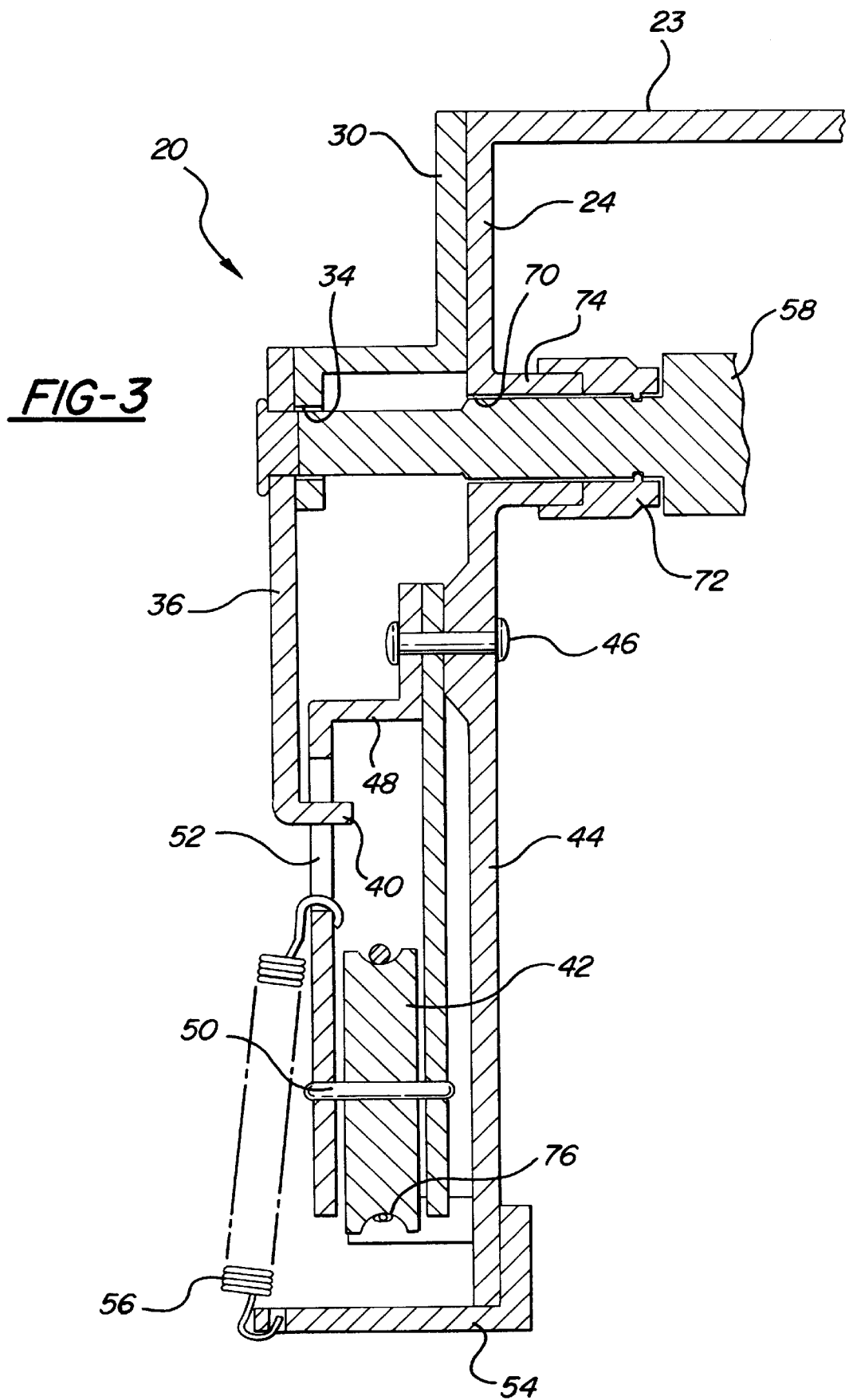
FIG. 3 is a fragmentary cross-section of the bi-directional actuation assembly taken through the line 3—3 in FIG. 2.

Referring to FIG. 3, spindle 58 has a tab 60 at one end. Tab 60 is sized to be received within slot 38 of actuation link 36 and staked thereto for a driving connection therebetween.

The opposite end of the spindle 58 has a knurled portion 64 for frictionally receiving handle 66 which has a complementary aperture 68. Handle 66 is slip fitted onto the spindle 58 and fastened thereto to provide a driving connection therebetween. A bearing surface 70 is intermediate the ends of the spindle 58. Coaxially mounted on the bearing surface is a bearing sleeve 72.

Face plate 24 has sleeve 74 which defines an aperture through which spindle 58 extends to engage actuation link 36. The inner circumferential surface presents a journal surface for rotatably supporting the spindle 58. Sleeve 72 engages the outer surface of the sleeve 74. In this manner, the bracket 23 firmly supports the spindle 58 so that it does not rattle.

Roller 42 has an arcuate groove 76 extending about the circumferential surface for receiving the respective cable 78, 79 which extends through slots 28 of the tabs 26 and is ultimately connected to the releasing assemblies 22 on each of the interengaged tracks 16.

Figure 4:
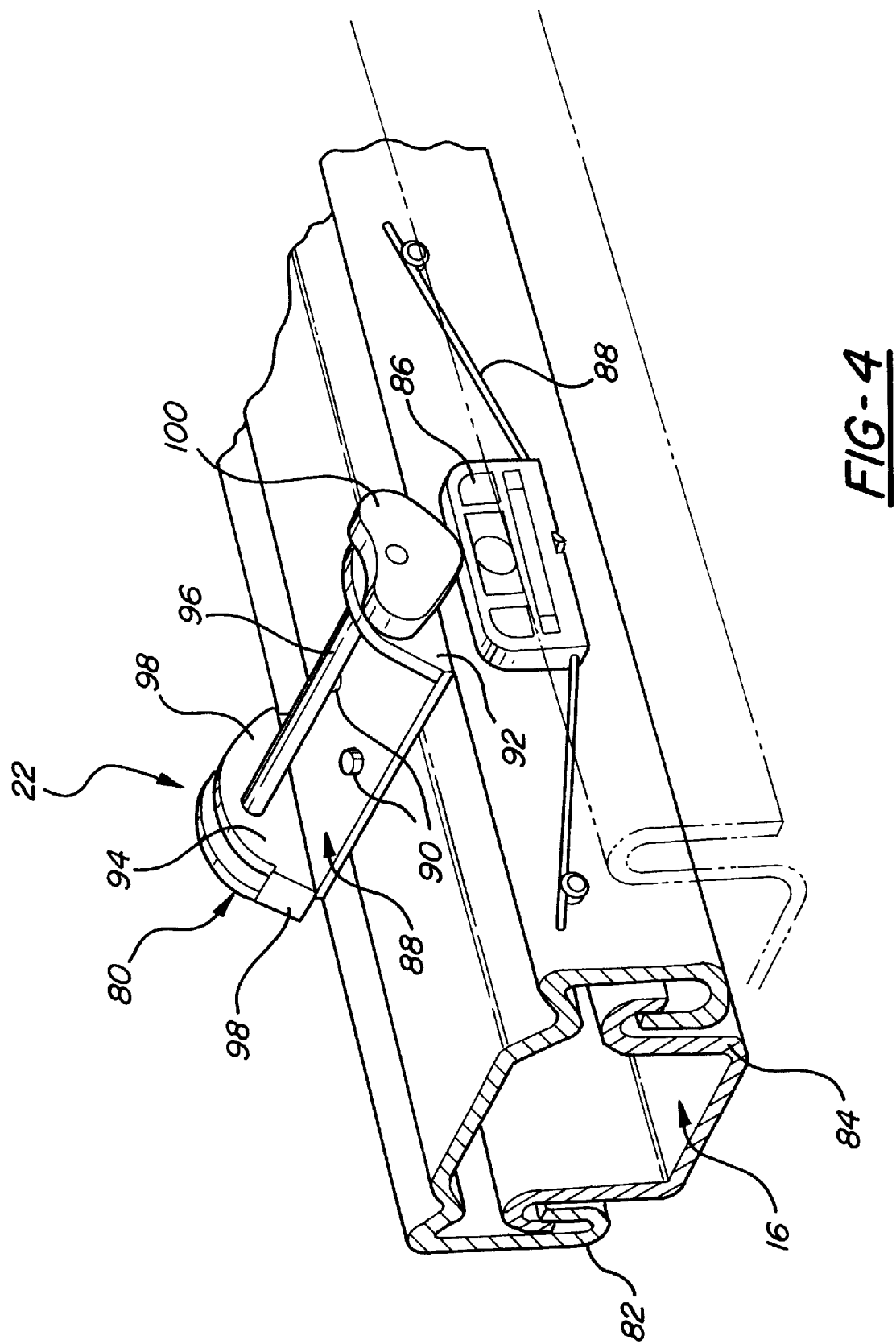
FIG. 4 is a fragmentary perspective view of a portion of a pair of interengaged track members with a lock release assembly of the track assembly of FIG. 1.
Figure 5:
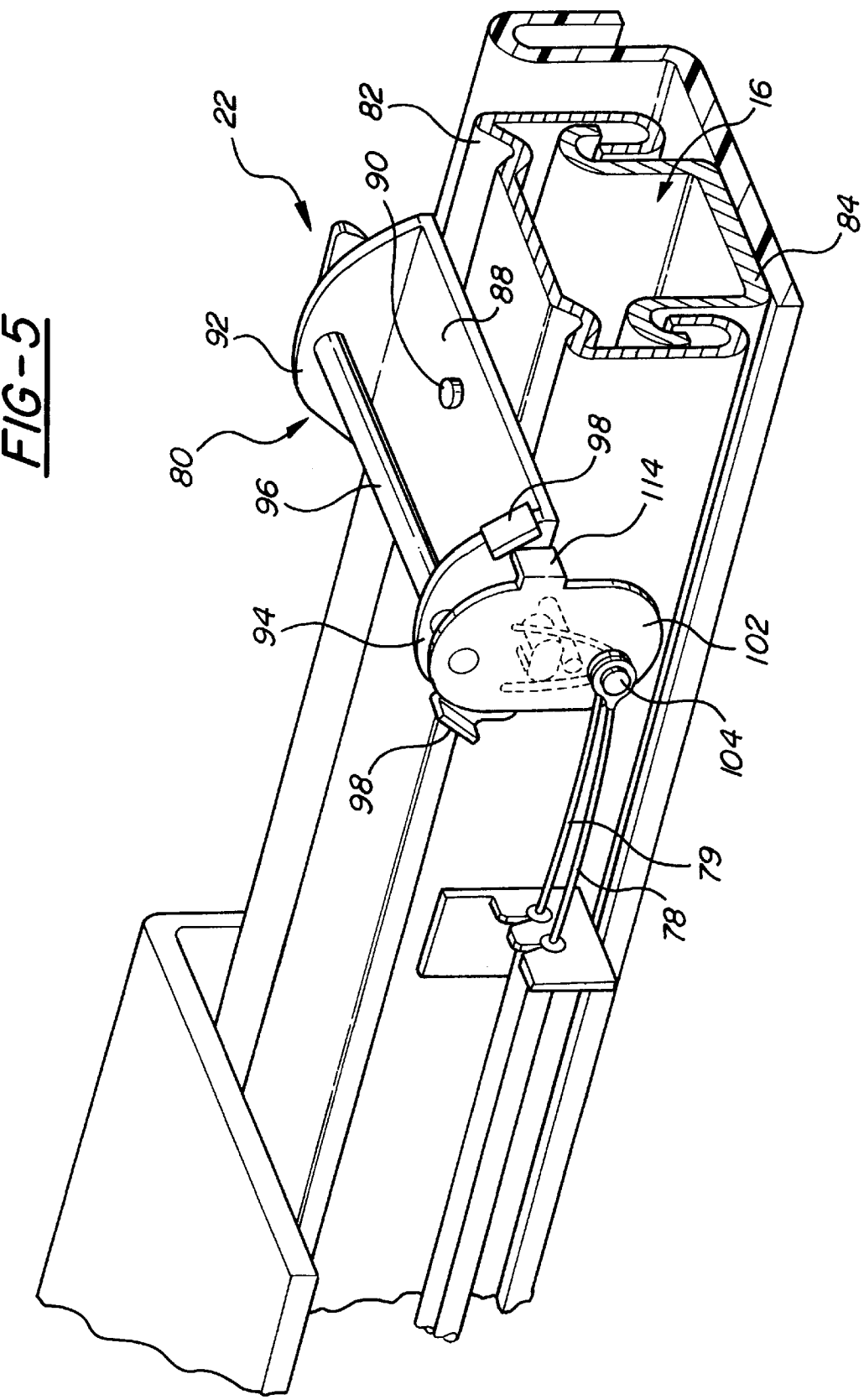
FIG. 5 is a fragmentary perspective view of the interengaged track members of FIG. 4.

Referring now to FIGS. 4 and 5, a lock release mechanism 80 is illustrated mounted on an upper track 82 of the interengaged tracks 16. The interengaged tracks 16 are more fully described in U.S. Pat. No. 5,741,000 and generally comprises a sliding upper track 82, and a fixed lower track 84. Rollers (not illustrated) support the sliding track 82 which allow the sliding track to move relative to the fixed lower track 84. Lower track 84 is mounted on the riser 14, whereas the seat cushion 18 is mounted on the sliding track 82. Each of the interengaged tracks 16 also has a locking assembly 86 which is mounted on a wire spring 89 to the wall of the upper track 82. The locking assembly 86 moves generally vertically to engage and disengage the tracks 82 and 84. When the locking assembly 86 is in the up condition, the locking assembly 86 will lock the upper track 82 to the lower track 84. In the down condition, the locking assembly 86 disengages the tracks 82, 84 and allows free forward and aft travel therebetween.

The lock release mechanism 80 generally comprises a U-shaped mounting bracket 88 which is rigidly mounted to the upper track 82. In the illustrated embodiment, the mounting bracket 88 is riveted to the upper track by rivets 90. Each end of the bracket 88 has a flange 92 and 94, each having a through bore for rotatably supporting pin 96. Flange 94 has two tabs 98 extending therefrom. A cam 100 is mounted at one end of the pin 96 for rotation therewith. A link 102 is mounted at the opposite end of the pin 96 for rotation therewith. Link 102 has a cable pin 104 extending generally parallel to the pin 96 but at an end opposite the connection with pin 96.

Figure 6:
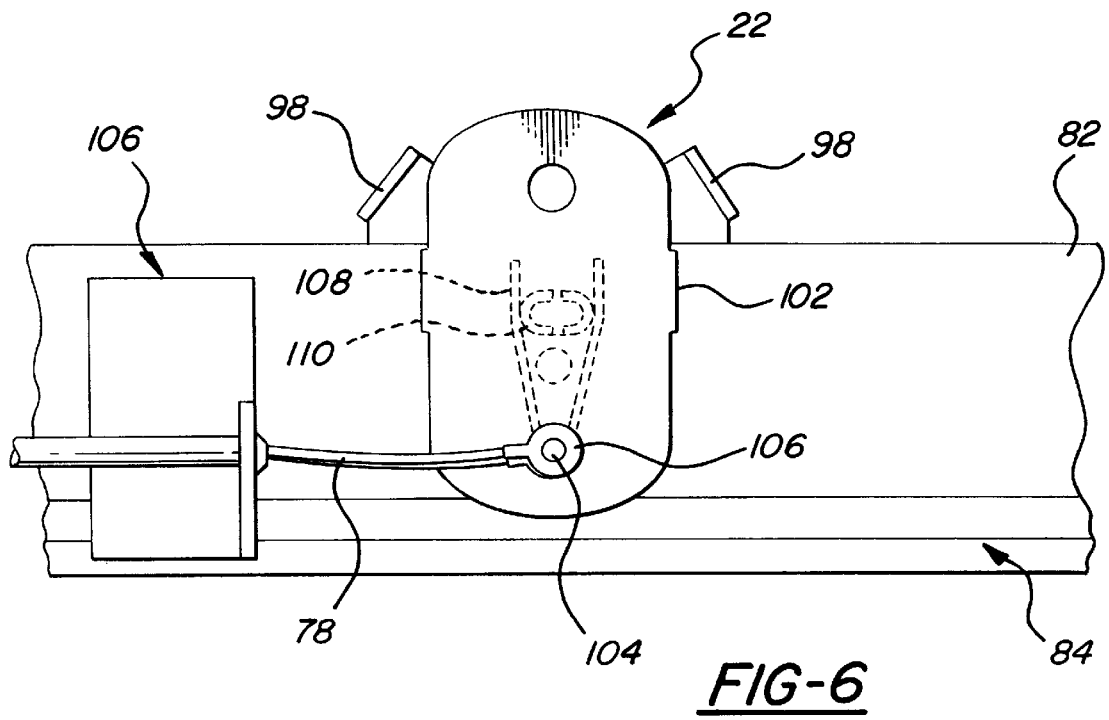
FIG. 6 is a fragmentary side elevation of the interengaged track members illustrating the locking assembly of FIG. 1 in a neutral condition.
Figure 7:
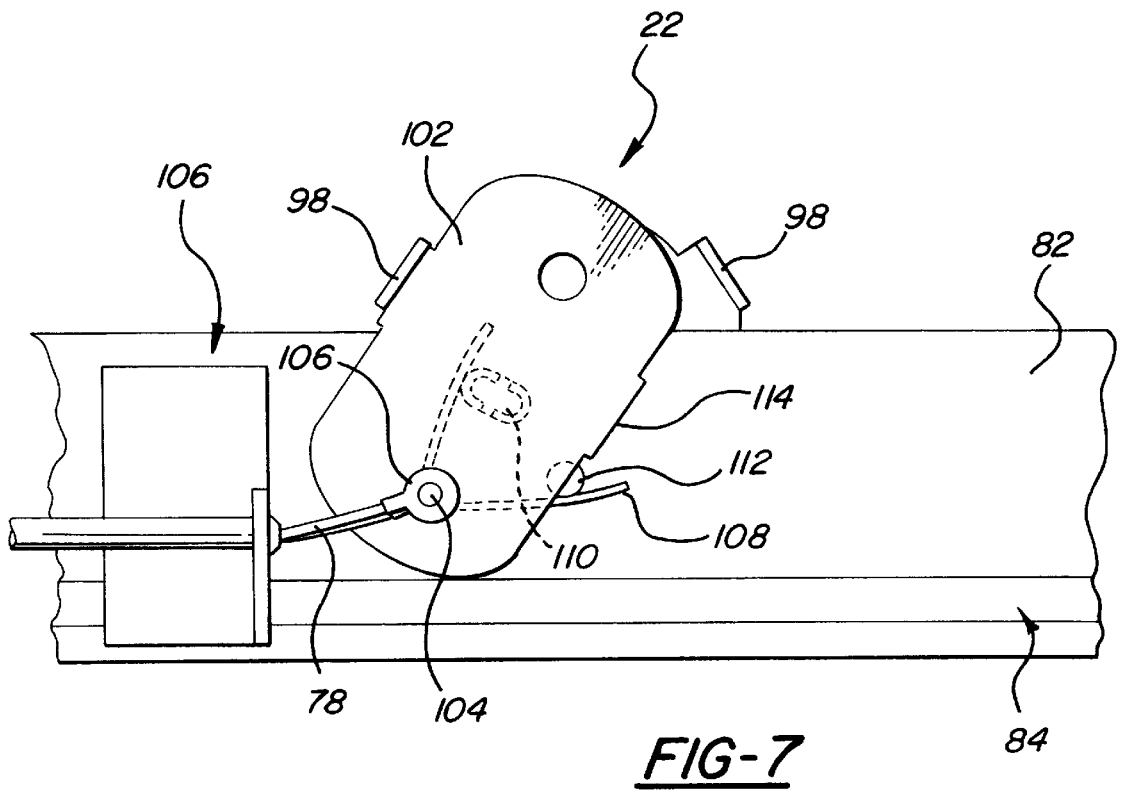
FIG. 7 is fragmentary side elevation of the interengaged track members of FIG. 6 illustrating the locking assembly in the release position.

Referring to FIGS. 6 and 7, the link 102 is illustrated in greater detail. The cable pin 104 receives eyelets 106 connected to the ends of the cables 78 and 79. Preferably, cables 78 and 79 are conventional bowden wire assemblies having a wire within a sheath. The bowden wires are conventionally mounted. Upper track 82 has a bracket 107 having a pair of keyhole slots for receiving the cables 78 and 79. Link 102 has a wire spring 108 which extends between a tab 110 and a pin 112. Tab 110 extends from the link 102 and pin 112 extends from the upper track 82 such that the spring 108 biases the link 102 to a neutral position. Link 102 has side tabs 114 for abutting with tabs 98 thereby limiting pivotal travel. As illustrated, pulling on either of the cables 78 or 79 will effect rotational movement of the link 102. Upon release of the pulling force, the bias of spring 108 will return the link 102 to the neutral position. The link 102 is symmetrical which allows rotation in either direction to effect the desired movement and return action. In other words, the cables 78 and 79 could be directed from the left or right side of the link 102.

Referring now to FIGS. 8 and 9, the cam 100 is illustrated. The cam 100 has an axis of rotation A (best shown in FIG. 4). The cam 100 has an oblong shaped lobe with a minimum radius R1. The radial distance from radius R1 increases as the cam 100 rotates from the neutral position. Thus, the cam 100 presents a radius R2 that is greater than radius R1. As the cam 100 rotates, from the neutral position (FIG. 8) the cam 100 will urge the locking assembly 86 downwardly to disengage the upper track 82 from the lower track 84 to permit sliding movement. The rotation of cam 100 must overcome the upward forces acting on the locking assembly 86 created by the spring 89. The shape of cam 100 is symmetrical which allows rotation in either direction to effect the desired downward movement of the locking assembly 86.

Cables 78 and 79 are tensionally associated with and extend from each of the releasing assemblies 22 in a tensioned relation through the bi-directional actuation assemblies 20. A pulling force in either of the cables 78 and 79 will effect rotation of the cam 100 to disengage the upper tracks 82 from the lower tracks 84 allowing forward and aft movement of the bench seat 12.

Figure 10:
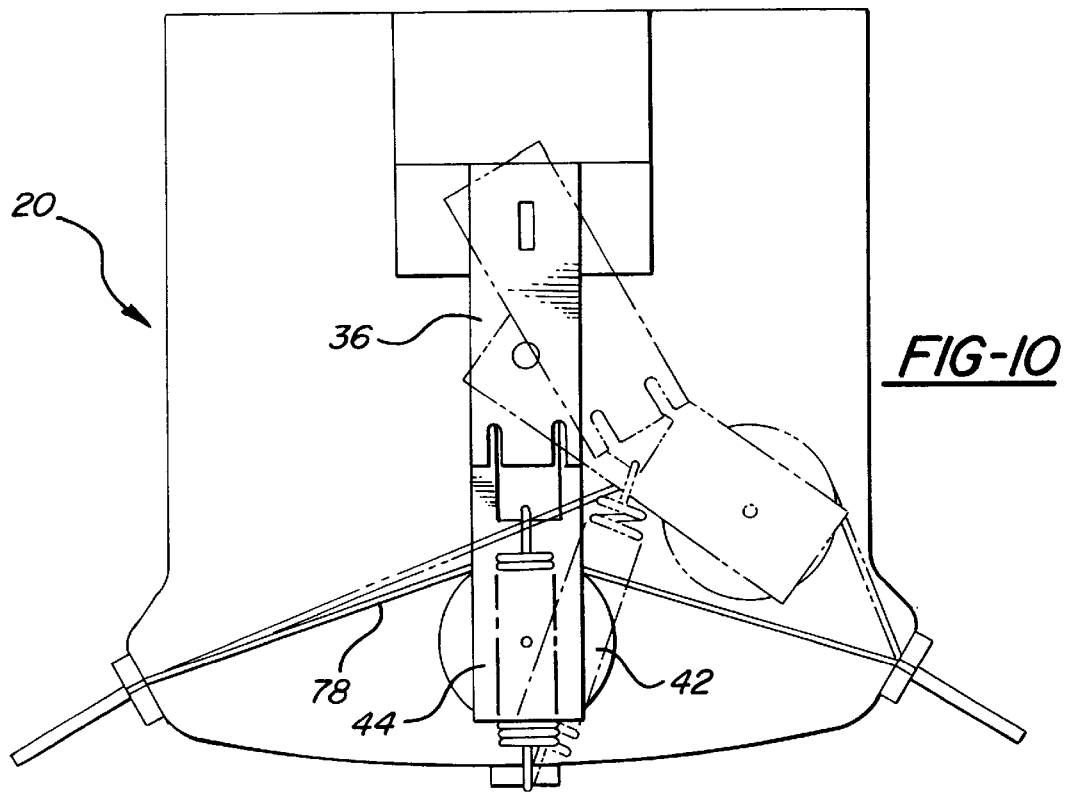
FIG. 10 is an elevation of the bi-directional actuation assembly of FIG. 2 showing a first release configuration thereof in phantom.
Figure 11:
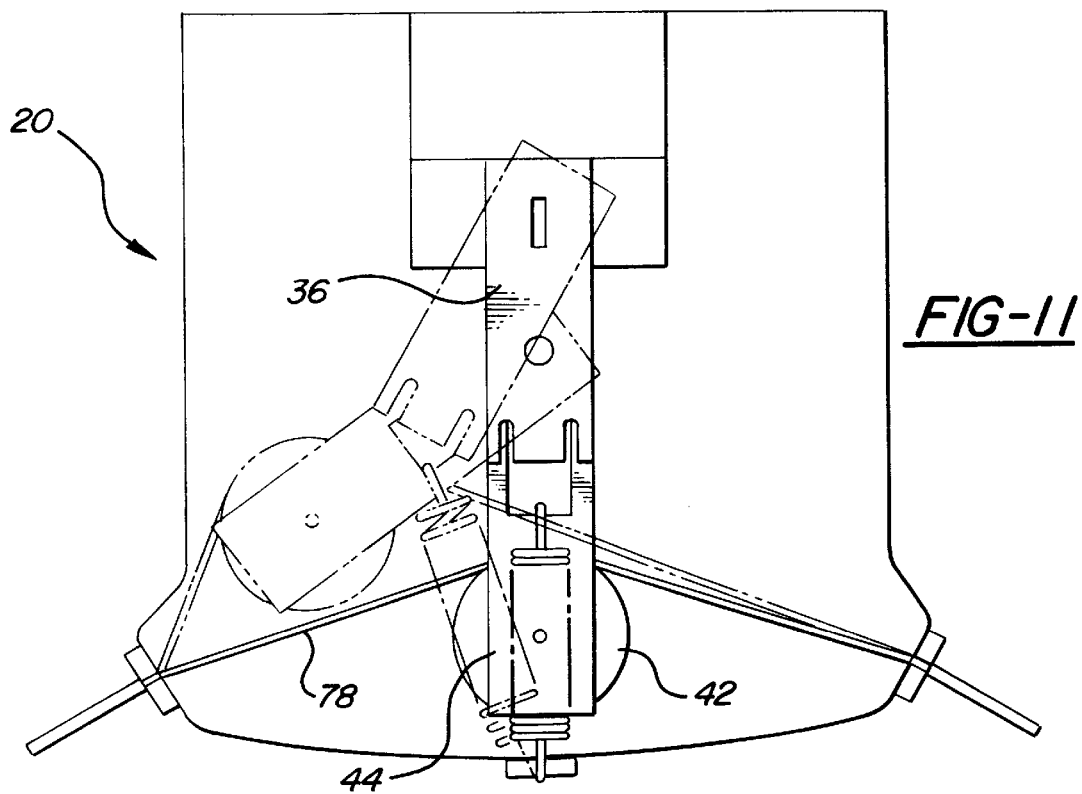
FIG. 11 is an elevation of the bi-directional actuation assembly of FIG. 2 showing a second release configuration thereof in phantom.

With reference to FIGS. 10 and 11 the desired pulling force in either of cables 78 and 79 is generated by the bi-direction actuation assemblies 20. In the preferred embodiment, one of the bi-direction actuation assemblies 20 is mounted on the front portion of the frame of the bench seat cushion 18 presenting a forwardly facing handle 66 and the other of the bi-direction actuation assemblies 20 is mounted on the rearward portion presenting a rearwardly facing handle. Side to side movement in either direction in response to manual actuation (either hand or foot) will create the desired pulling forces.

Manual rotation of the handle 66 will cause the actuation link 36 to rotate and will responsively rotate the roller lever 44. Roller 42 will rotate and will shorten the effective length of the cable 78. The rotation of roller 42 will thus generate the desired pulling forces in the cable 78. As is illustrated, rotation in either direction will create the same pulling forces in the cables. The spring 56 will return the roller lever 44 and roller 42 back to the neutral position regardless of the direction of rotation.

Although the preferred embodiment illustrates the use of a bi-directional actuation assembly with a forward facing and a rearward facing handle, it is readily apparent that the bench seat could be manufactured using a single bi-directional actuation assembly with either a forward facing or a rearward facing handle.

While the present invention has been described in reference to a particular embodiment, one skilled in the art can recognize that certain modifications could be made without departing from the scope of the present invention.

I claim:

1. A bi-directional actuation assembly for a vehicle seat having a mounting structure comprising a pair of interengaged tracks slidably mounting the vehicle seat and a pair of locking assemblies operatively associated with the tracks to selectively engage and disengage each of the interengaged tracks, said bi-directional actuation assembly comprising:

a rotatably mounted handle, a roller mounted on a pivotally mounted lever, said lever operatively connecting said handle to said roller, a biasing means for biasing said roller to a neutral position, a cable extending over said roller and adapted for being tensionally connected to each of said locking assemblies, whereby rotation of said handle responsively moves said roller against said bias thereby tensioning said cable and moving both of the locking assemblies to a disengaged position, a releasing assembly adapted for being mounted to each of the interengaged tracks, said releasing assembly comprising a pivotally mounted link connected to an end of said cable and a cam operatively connected with said link for engaging one of the locking assemblies, said cam configured and arranged for urging the locking assembly from an engaged position to said disengaged position upon rotation of said cam in either direction from a neutral position of said link.

2. A bi-directional actuation assembly as claimed in claim 1 wherein said operative connection between said lever and said handle comprises a rotatably mounted spindle having said handle mounted at a first end and an actuation link mounted at a second end, said actuation link slidably engaging said lever.

3. A bi-directional actuation assembly as claimed in claim 2 wherein said bi-directional actuation assembly further comprises a mounting bracket, said mounting bracket having a journal bearing rotatably receiving said spindle and an aperture through which said lever is pivotally mounted.

4. A bi-directional actuation assembly as claimed in claim 1 wherein said releasing assembly further includes a biasing means mounted to said link for biasing said link to said neutral position.

5. A bi-directional actuation assembly as claimed in claim 4 wherein said releasing assembly further comprises a U-shaped mounting bracket, a pin rotatably mounted on flanges of said U-shaped mounting bracket and said link being mounted to a first end of said pin and said cam being mounted to an opposite second end of said pin.

6. A bi-directional actuation assembly as claimed in claim 5 wherein said operative connection between said lever and said handle comprises a rotatably mounted spindle having said handle mounted at a first end and an actuation link mounted at a second end, said actuation link slidably engaging said lever.

7. A bi-directional actuation assembly as claimed in claim 6 further comprising a mounting bracket, said mounting bracket having a journal bearing rotatably receiving said spindle and an aperture through which said lever is pivotally mounted.

8. A vehicle seat assembly having a mounting structure comprising a pair of interengaged tracks slidably mounting said seat assembly and a pair of locking assemblies operatively associated with said tracks to selectively engage and disengage each of said interengaged tracks, and a bi-directional actuation assembly comprising:

a rotatably mounted handle,
a roller mounted on a pivotally mounted lever, said lever operatively connecting said handle to said roller,
a biasing means for biasing said roller to a neutral position,
a cable tensionally associated with each of said locking assemblies and extending over said roller, whereby rotation of said handle responsively moves said roller against said bias thereby tensioning said cable and moving both of said locking assemblies to a disengaged position.

9. A vehicle seat assembly as claimed in claim 8 wherein said operative connection between said lever and said handle comprises a rotatably mounted spindle having said handle mounted at a first end and an actuation link mounted at a second end, said actuation link slidably engaging said lever.

10. A vehicle seat assembly as claimed in claim 9 wherein said bi-directional actuation assembly further comprises a mounting bracket, said mounting bracket having a journal bearing rotatably receiving said spindle and an aperture through which said lever is pivotally mounted.

11. A vehicle seat assembly as claimed in claim 8 wherein said bi-directional actuation assembly further comprises a releasing assembly mounted on each of said interengaged tracks, said releasing assembly comprising a pivotally mounted link connected to an end of said cable, a biasing means for biasing said link to a neutral position, and a cam operatively connected with said link and engaging one of said locking assemblies, said cam configured and arranged to urge said locking assembly from an engaged position to said disengaged position upon rotation of said cam in either direction from said neutral position of said link.

12. A vehicle seat assembly as claimed in claim 11 wherein said releasing assembly further comprises a U-shaped mounting bracket, a pin rotatably mounted on flanges of said U-shaped mounting bracket and said link being mounted to a first end of said pin and said cam being mounted to an opposite second end of said pin.

13. A vehicle seat assembly as claimed in claim 12 wherein said operative connection between said lever and said handle comprises a rotatably mounted spindle having said handle mounted at a first end and an actuation link mounted at a second end, said actuation link slidably engaging said lever.

14. A vehicle seat assembly as claimed in claim 13 wherein said bi-directional actuation assembly further comprises a mounting bracket, said mounting bracket having a journal bearing rotatably receiving said spindle and an aperture through which said lever is pivotally mounted.

15. A vehicle seat assembly as claimed in claim 8 wherein said bi-directional actuation assembly is mounted under said seat assembly with a forwardly facing handle.

16. A vehicle seat assembly as claimed in claim 8 wherein said bi-directional actuation assembly is mounted under said seat assembly with a rearwardly facing handle.

17. A vehicle seat assembly as claimed in claim 16 further comprising a second bi-directional actuation assembly mounted under said seat assembly, said second bi-directional actuation assembly comprising:

a rotatably mounted forwardly facing handle,
a second roller mounted on a pivotally mounted second lever, said second lever operatively connecting said forwardly facing handle to said second roller,
a second biasing means for biasing said second roller to a neutral position,
a second cable tensionally associated with each of said locking assemblies and extending over said second roller, whereby rotation of said forwardly facing handle responsively moves said second roller against said bias thereby tensioning said second cable and moving both of said locking assemblies to a disengaged position.

18. A vehicle seat assembly as claimed in claim 17 wherein said operative connection between said second lever and said second handle comprises a rotatably mounted second spindle having said second handle mounted at a first end and a second actuation link mounted at a second end, said second actuation link slidably engaging said second lever and said second bidirectional actuation assembly further comprises a second mounting bracket having a journal bearing rotatably receiving said second spindle and an aperture through which said second lever is pivotally mounted.

19. A vehicle seat assembly as claimed in claim 18 wherein one of said bi-directional actuation assemblies further comprises a releasing assembly mounted on each of said interengaged tracks, said releasing assembly comprising a pivotally mounted link connected to an end of each of said cables, a biasing means for biasing said link to a neutral position, and a cam operatively connected with said link and engaging one of said locking assemblies, said cam configured and arranged to urge said locking assembly from an engaged position to said disengaged position upon rotation of said cam in either direction from said neutral position of said link.

20. A vehicle seat assembly as claimed in claim 19 wherein said releasing assembly further comprises a U-shaped mounting bracket, a pin rotatably mounted on flanges of said U-shaped mounting bracket and said link being mounted to a first end of said pin and said cam being mounted to an opposite second end of said pin.

* * * * *